US008918449B2

(12) United States Patent
Patel

(10) Patent No.: US 8,918,449 B2
(45) Date of Patent: Dec. 23, 2014

(54) TERMINAL USER-INTERFACE CLIENT FOR MANAGING MULTIPLE SERVERS IN HYBRID CLOUD ENVIRONMENT

(76) Inventor: Bhupendra Mohanlal Patel, Fremont, CA (US)

(*) Notice: Subject to any disclaimer, the term of this patent is extended or adjusted under 35 U.S.C. 154(b) by 396 days.

(21) Appl. No.: 13/300,607

(22) Filed: Nov. 20, 2011

(65) Prior Publication Data

US 2013/0132461 A1  May 23, 2013

(51) Int. Cl.
*G06F 15/16* (2006.01)
*G06F 9/54* (2006.01)

(52) U.S. Cl.
CPC ..................... *G06F 9/547* (2013.01)
USPC ............................ 709/202; 709/203; 709/226

(58) Field of Classification Search
CPC . H04L 63/0272; H04L 67/1002; H04L 41/22; G06F 17/30067
USPC .......................................... 709/202, 203, 226
See application file for complete search history.

(56) References Cited

U.S. PATENT DOCUMENTS

| 8,572,706 | B2* | 10/2013 | Lucovsky et al. | 726/7 |
|---|---|---|---|---|
| 8,582,462 | B2* | 11/2013 | Sharma et al. | 370/252 |
| 8,745,384 | B2* | 6/2014 | Persaud et al. | 713/165 |
| 2003/0163570 | A1* | 8/2003 | Hendley et al. | 709/227 |
| 2004/0216140 | A1* | 10/2004 | Hiltgen | 719/320 |
| 2006/0090167 | A1* | 4/2006 | Keohane et al. | 719/319 |
| 2010/0274772 | A1* | 10/2010 | Samuels | 707/693 |
| 2012/0151074 | A1* | 6/2012 | Wood et al. | 709/228 |
| 2012/0303814 | A1* | 11/2012 | Ferris | 709/226 |

* cited by examiner

*Primary Examiner* — Duyen Doan

(57) ABSTRACT

In one exemplary embodiment, a terminal user-interface (UI) client is configured to accept a user-scripted command from a user. The user-scripted command includes an operating system command or a user-customized command. The user-scripted command is passed to a distributed server management platform. A node tag input by a user is accepted. The node tag identifies at least one agent node in a server in the cloud-computing platform to execute the user-scripted command. A distributed server management platform that passes the user-scripted command to a group broker of an agent group comprising the agent node identified by the node tag, and to pass a command result to the terminal UI. A group broker to pass the user-scripted command to the agent node, and to pass a command result from the agent node to the distributed server management platform.

13 Claims, 9 Drawing Sheets

TERMINAL USER-INTERFACE CLIENT FOR MANAGING MULTIPLE SERVERS IN HYBRID CLOUD ENVIRONMENT

BACKGROUND OF THE INVENTION

1. Field

This application relates generally to cloud-based servers management, and more specifically to a terminal user-interface (UI) client for managing multiple servers in hybrid cloud environment.

2. Related Art

Cloud computing can involve the delivery of computing as a service, whereby shared resources, software, and information are provided to client computers as a utility over a computer network (e.g. the Internet). A cloud computing service can provide computing resources that are requested by a user through an interact service, regardless of time and location In such a cloud computing service, when a client requests the execution of a command by an application, then one or more servers in a server layer of the cloud can execute the application and transmit the result of execution to the client. If the number of servers involved in executing the command is large, the result data can affect system bandwidth.

Prior to the disclosure of the embodiments described herein, a user of web terminal client may pass command input by a user to a connected agent. The connect agent may then execute the command and pass the result back to the Web terminal client. Thus, command execution may be allowed on only a single remote server.

Additionally, a user of a client interface of a cloud computing service may interact with a control node via a predesigned client interface with design limitations that can inhibit a user's input choices. Thus, as script may run on multiple remote servers. However, these client interfaces do not include terminal interfaces that the execution of terminal command scripts (system or otherwise).

However, the user may want to customize and execute commands and scripts across the servers of the cloud environment such as may be available with a command line interpreter (CLI) ('shell') that is similar to those used by the operating systems (e.g. Linux, Unix, Microsoft Windows® and the like) of the servers and/or some other user-customized format. Thus, a method and system are desired for a single unified terminal user-interface (UI) client for managing multiple servers within the clouds to improve beyond existing methods of user interfaces with the servers of a cloud-computing platform.

BRIEF SUMMARY OF THE INVENTION

In one exemplary embodiment, a terminal user-interface (UI) client is configured to accept a user-scripted command from a user. The user-scripted command includes an operating system command or a user-customized command. The user-scripted command is passed to a distributed server management platform. A node tag input by a user is accepted. The node tag identifies at least one agent node in a server in the cloud-computing platform to execute the user-scripted command. A distributed server management platform that passes the user-scripted command to a group broker of an agent group comprising the agent node identified by the node tag, and to pass a command result to the terminal UI. A group broker to pass the user-scripted command to the agent node, and to pass a command result from the agent node to the distributed server management platform.

BRIEF DESCRIPTION OF THE DRAWINGS

The present application can be best understood by reference to the following description taken in conjunction with the accompanying figures, in which like parts may be referred to by like numerals.

(In FIG. 6, in the first step, additional optional input such as filter criteria & batching count can also be included)

DETAILED DESCRIPTION OF THE INVENTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

Disclosed are a system, method, and article of manufacture for a terminal user-interface (UI) client for managing a server in a cloud-computing platform. Although the present embodiments have been described with reference to specific example embodiments, it will be evident that various modifications and changes may be made to these embodiments without departing from the broader spirit and scope of the various claims.

System Architecture

Figure 1:
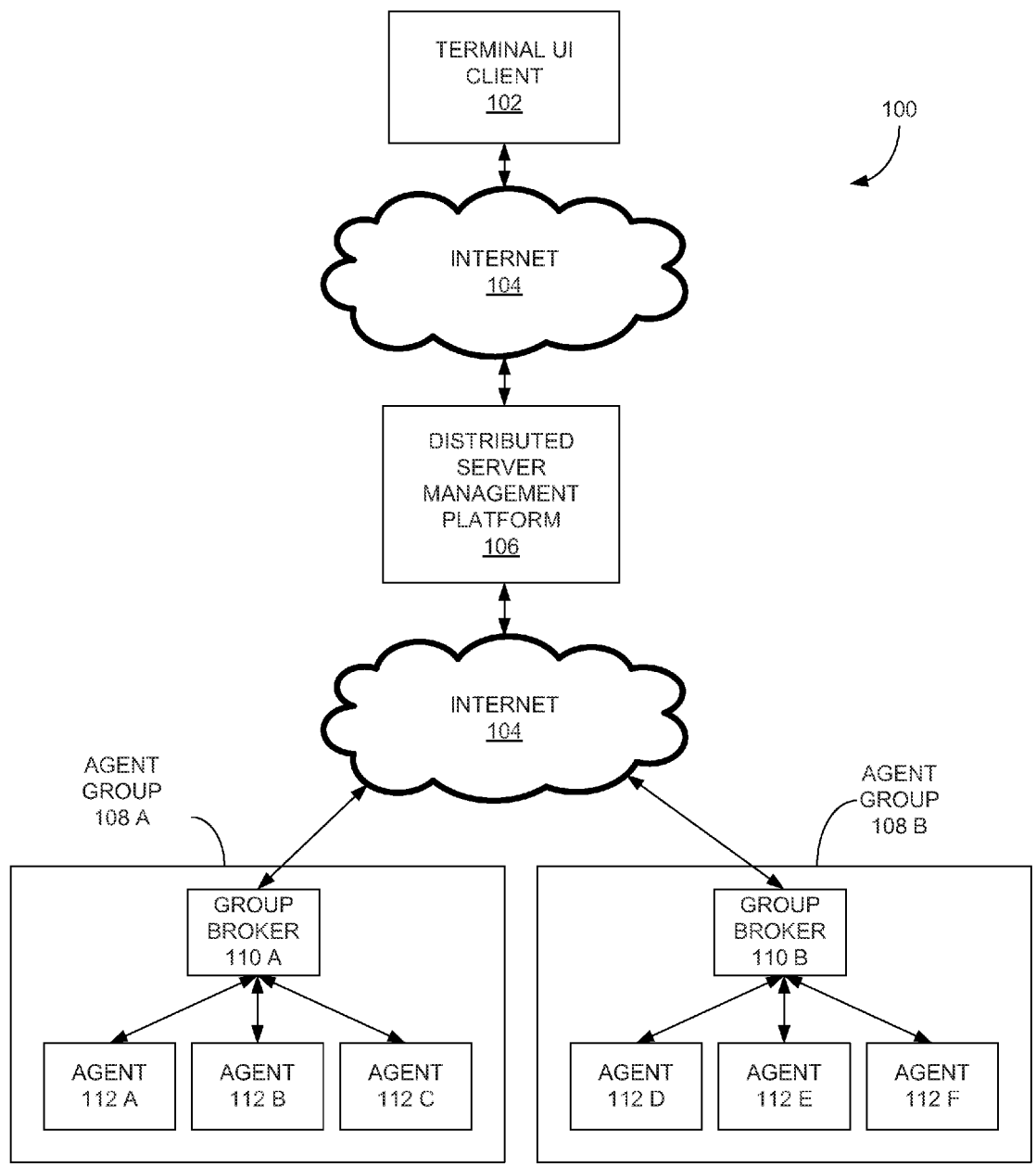
FIG. 1 illustrates an example system for a single terminal user-interface (UI) client for managing a cloud-computing server layer, according to some embodiments.

FIG. 1 illustrates an example system 100 for a single terminal user-interface (UI) client for managing a cloud-computing server layer, according to some embodiments. System 100 can include at least one terminal UI client 102. Generally, terminal UI client 102 can include a device used for entering data into, and displaying data from, a computer or a computing system. Terminal UI client 102 can emulate an actual terminal networked to a server such as a plurality of servers operating in a server layer (such as the servers upon which agent groups 108 A-B reside (not shown)) of a cloud-computing platform. A server layer of a cloud-computing platform can include computer hardware and/or computer software products that are specifically designed for the delivery of cloud services, including multi-core processors, cloud-specific operating systems and other combined offerings. Terminal UI client 102 can enable a user to manage a plurality of server through a single UI (i.e. a one-to-many terminal-server relationship). Terminal UI client 102 can accept a command to execute (e.g. a Unix/Linux command such as 'ls') in the same form of user input as would be input into a 'regular' terminal in a one-to-one terminal-server relationship.

System 100 can include distributed server management platform 106 that can then manage the execution of the command across multiple targeted servers in parallel. For example, user input can include the command to execute as well as a node tag identifier that identifies a specified node tag residing on one or more servers in the server layer.

Agent groups 108 A-B reside in the server layer in a cloud-computing platform according to some embodiments. It is noted that other server layers can comprises other configurations as well as more or fewer servers. Agent groups 108 A-B includes agents and broker functionalities that can reside in actual and/or virtual server systems. In some embodiments, each user of a terminal UI client 102 can be provided one group broker 110 A-B per agent group. Moreover, each server can include one agent per server installed on a server. A user can input commands into system 100 to create and/or modify agent groups. For example, agent groups can be created based on the geographic location of the physical servers. Each server on which an agent is installed can be associated with one or more node tags. A node tag allows the distributed server management platform 106 to target specified servers on which to execute commands input into the terminal UI client 102.

System 100 can support multiple command types that are typically associated with terminals and/or terminal emulators. For example, system 100 can accept and execute commands that are included in an operating system command set such as Linux, Windows®, Unix, etc. Thus, servers of the server layer can include a heterogeneous set of operating systems. Additionally, system 100 can accept and execute custom commands that are supported by various programming languages (e.g. Java® and the like). User-defined commands can be generated with the custom command option. An example of a custom command package in Java is provided in FIG. 7 and its concomitant description.

System 100 can aggregate the resulting output of a command executed across multiple servers by agents 112 A-E. In this way, 'raw' output of each executing server is not returned to the terminal UI client 102. Instead, a user can input specified criteria to be returned once a command is executed. For example, system 100 can determine if a command was executed successfully or unsuccessfully on each server identified by a node tag. An aggregate count of successful servers can be obtained and returned. Access of the output/error details can be provided for servers that failed to execute a command successfully. For example, this information can be maintained in log files.

System 100 can execute command input in terminal UI client 102 with each specified server identified by anode tag in parallel. Alternatively, system 100 can executed commands through dynamic auto-batching of server nodes. A batch quantity can be specified by the user with the command. For example, a user can specify a batch of four with a server count of one hundred that include the specified node tag. The servers would be broken down into four groups of twenty-five servers each. The command would then be executed in parallel on each of the twenty-five servers of the first batches. However, the command would be executed upon each batch in series. In this way, servers with a specified node tag can be made available during execution of a command, but from the user perspective, the command is executed once through the terminal UI client 102. In one example, system 100 can provide the user the option to approve command execution on each batch, instead of directly executing the command automatically in series. Additional information about the components of system 100 is provided in the following figures.

Figure 2:
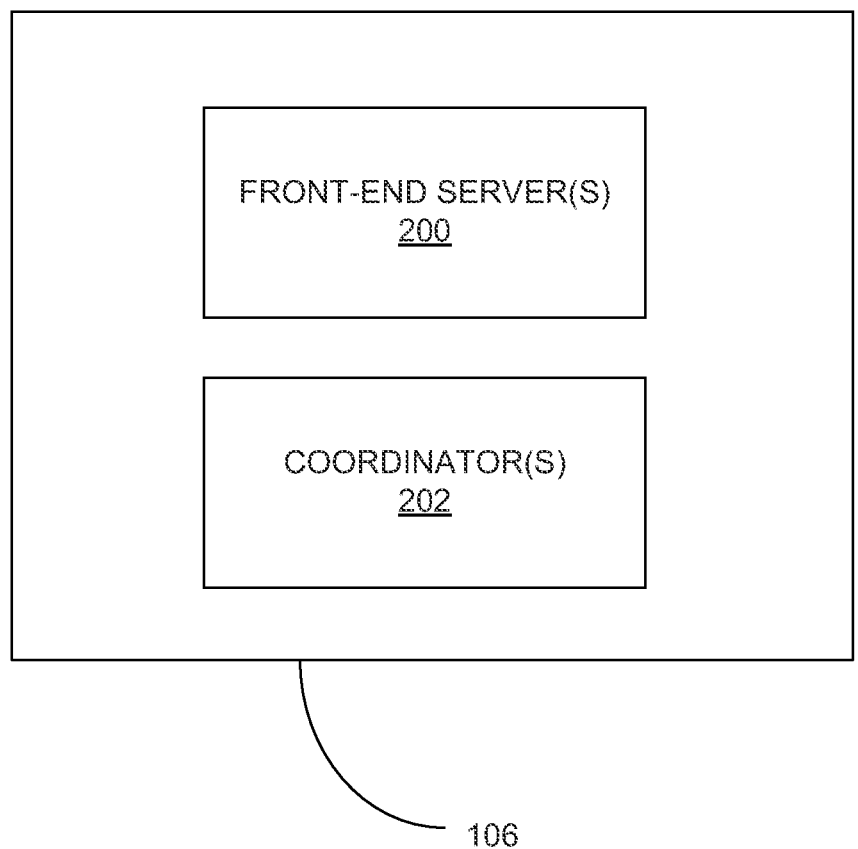
FIG. 2 illustrates an example distributed server management platform.

FIG. 2 illustrates an example distributed server management platform 106 of system 100, according to some embodiments. Front-end server(s) 200 can obtain command input from remote terminal UI clients. For each user account, front-end server 200 can locate an appropriate coordinator 202. Each user account can be assigned a coordinator 202. Coordinator 202 can manage the distribution of command input from a user account to various group brokers and agents also associated with the user account. Coordinator 202 can further obtain and/or aggregate result data about the execution of command input from a user account from the group brokers and agents. Coordinator 202 can then provide this result data for each command input for each user account to front-end server 200. Front-end server 200 can format and provide access to result data via a terminal UI client.

Figure 3:
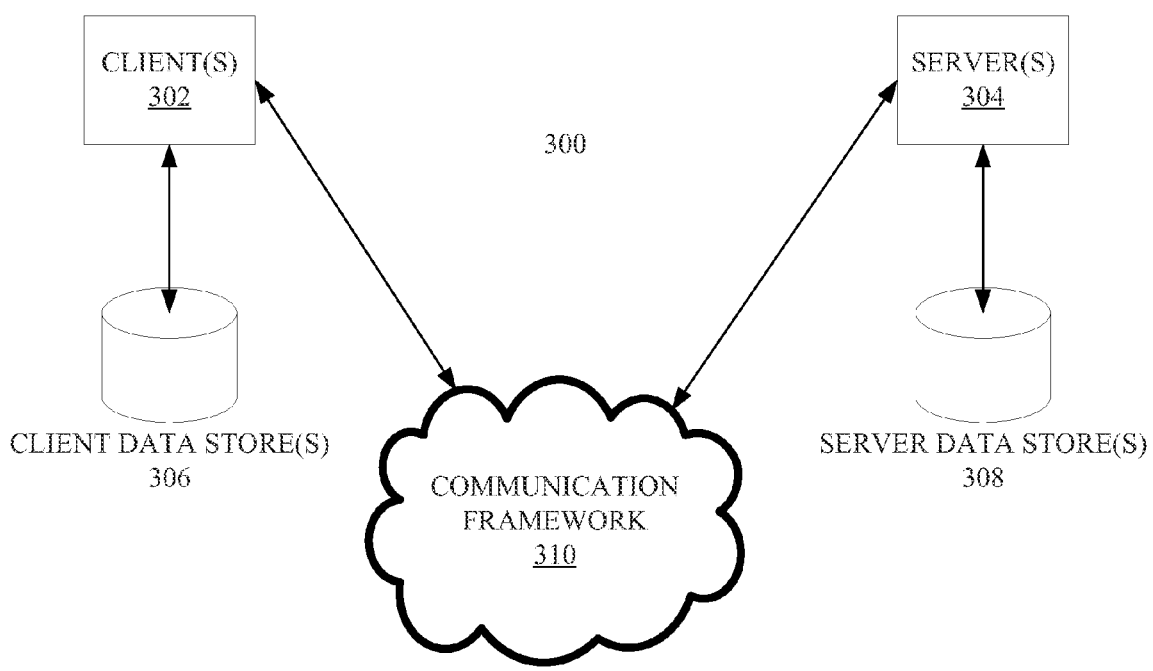
FIG. 3 illustrates a sample-computing environment that can be utilized in some embodiments.

FIG. 3 illustrates a sample-computing environment 300 that can be utilized in some embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304.

Figure 4:
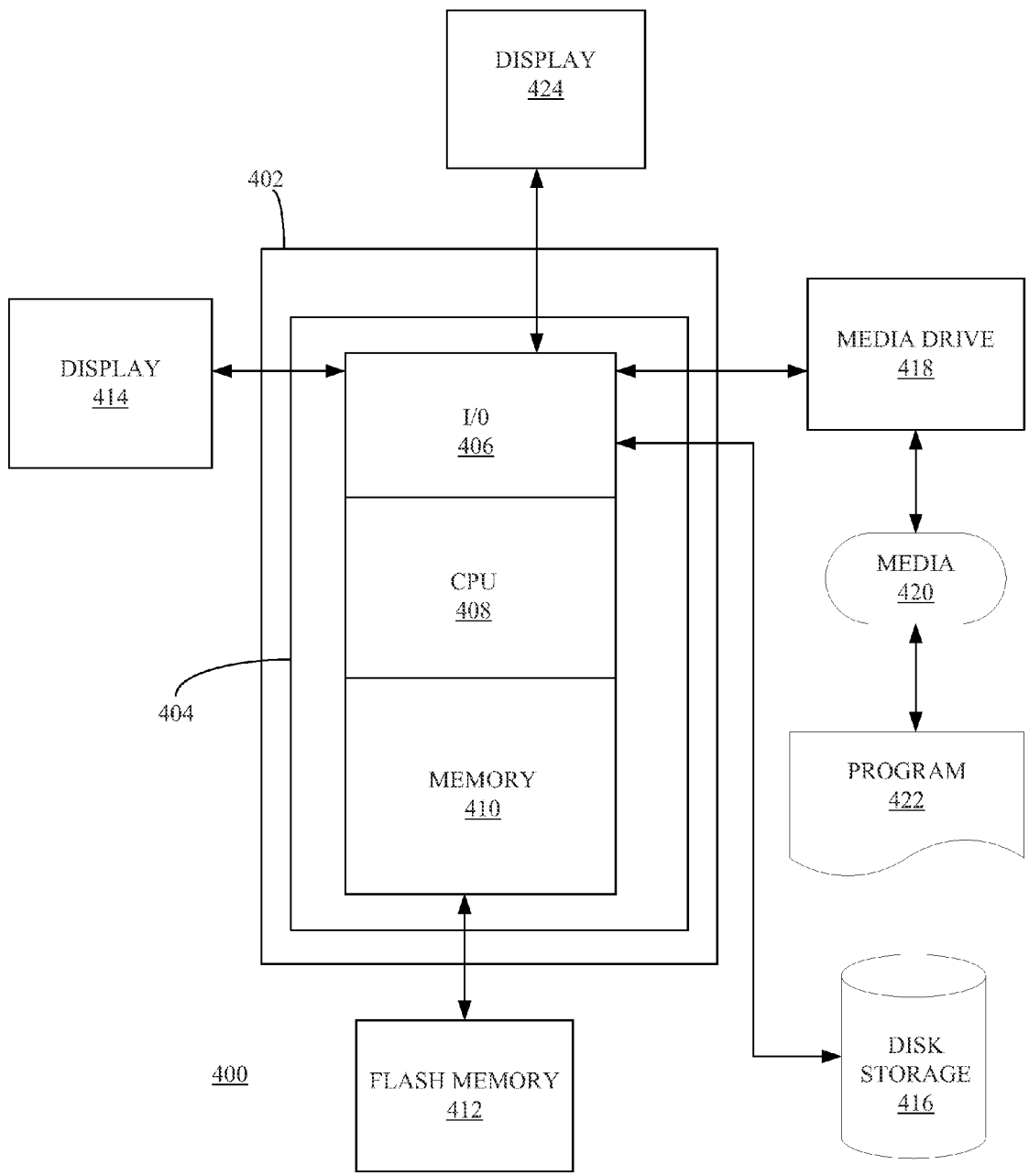
FIG. 4 depicts computing system with a number of components that may be used to perform the various processes described herein.

FIG. 4 depicts an exemplary computing system 400 that can be configured to perform any one of the above-described processes. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform the various processes described herein. The main system 402 includes a motherboard 404 having an I/O section 406, one or more central processing units (CPU) 408, and a memory section 410, which may have a flash memory card 412 related to it. The I/O section 406 is connected to a display 424, a keyboard 414, a disk storage unit 416, and a media drive unit 418. The media drive unit 418 can read/write a computer-readable medium 1120, which can contain programs 422 and/or data.

Processes

Figure 5:
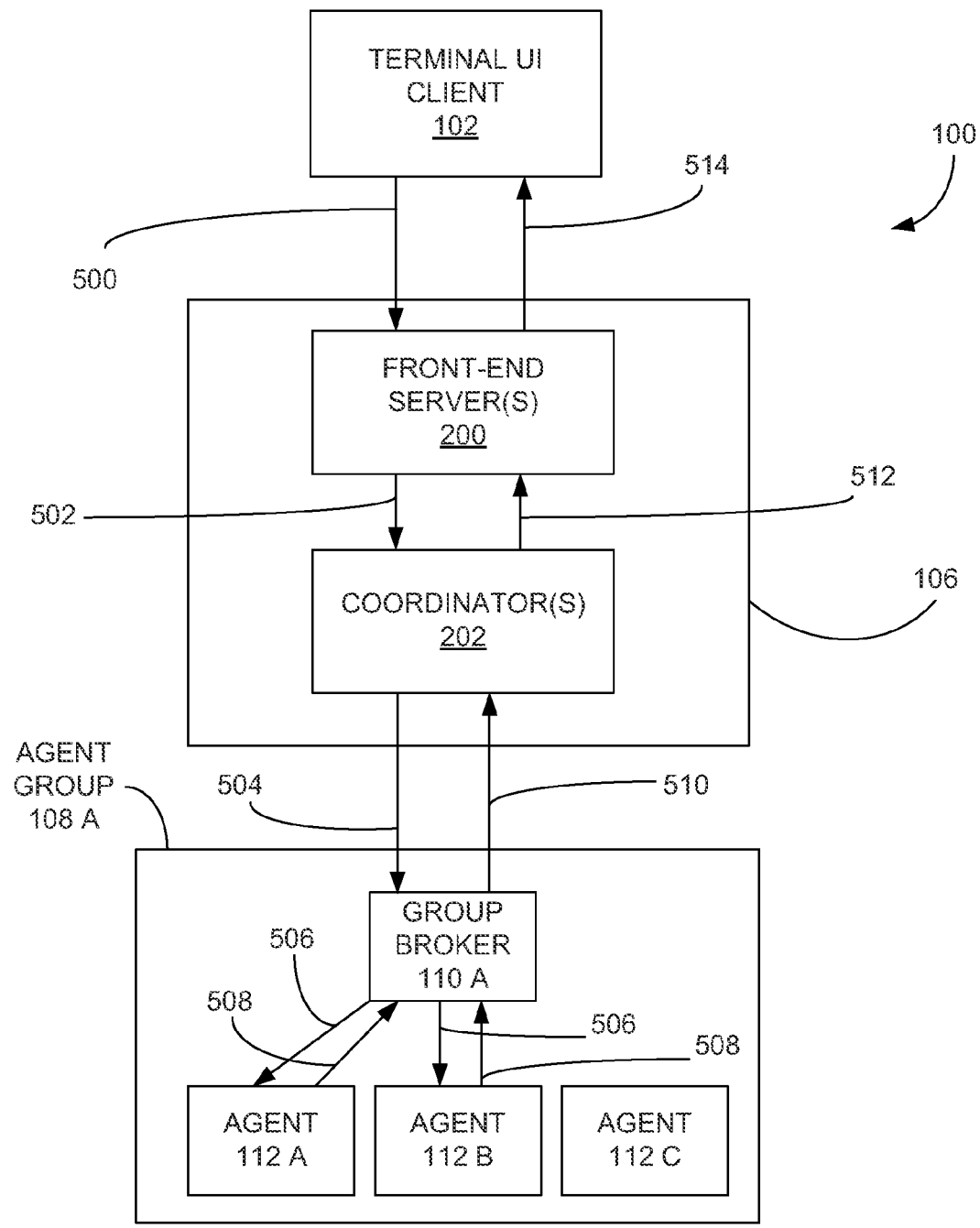
FIG. 5 illustrates an exemplary process for terminal UI client for managing a cloud-computing server layer, according to some embodiments.

FIG. 5 illustrates an exemplary process for terminal user-interface (UI) client for managing a cloud-computing server layer, according to some embodiments. Regarding FIG. 5 (as well as FIG. 6), for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with some embodiments, occur in a different order and/or concurrently with other acts from that shown and described herein. For example, those skilled in the art understand and appreciate that a methodology could alternatively be represented as a series of interrelated states or events, such as in a state diagram. Moreover, not all illustrated acts may be required to implement a methodology in accordance with some embodiments.

In step 500 of FIG. 5, the terminal UI client 102 passes a command input entered by a user to distributed server management platform 106. Command input can include the command to be executed as well as node tag identifiers, dynamic auto-batching instructions and/or result output instructions (e.g. filtering criteria for results, result logging instructions and the like). It should be noted that in other embodiments, these instructions can also be provided separately. For example, the user may provide the command input, while the result output instructions can be a system setting passed by the distributed server management platform 106. In step 502, front-end server 200 locate the appropriate coordinator 202 for the user account associated with the group brokers (such as group broker 110 A). Front-end server 200 then passes the command input to coordinator 202. Each user of system 100 can be assigned a coordinator 202. In step 504, coordinator 202 then passes the command input the appropriate group broker (e.g. group broker 110 A). In step 506, group broker 110 A can then passes the command input to the appropriate agent nodes 112 A-B for execution of the command input. In step 508, agent nodes 112 A-B can pass the data of the result output instructions, such as result count of executed commands, back to group broker 110 A. In step 510, group broker 110 A can aggregate the result data of each agent with its group and pass this information back to coordinator 202. Coordinator 202 then aggregates the result information across other group brokers (not shown). In step 512, coordinator 202 passes the aggregated information to front-end server 200. In step 514, front-end server 200 can format and push the result data to terminal UI client.

Figure 6:
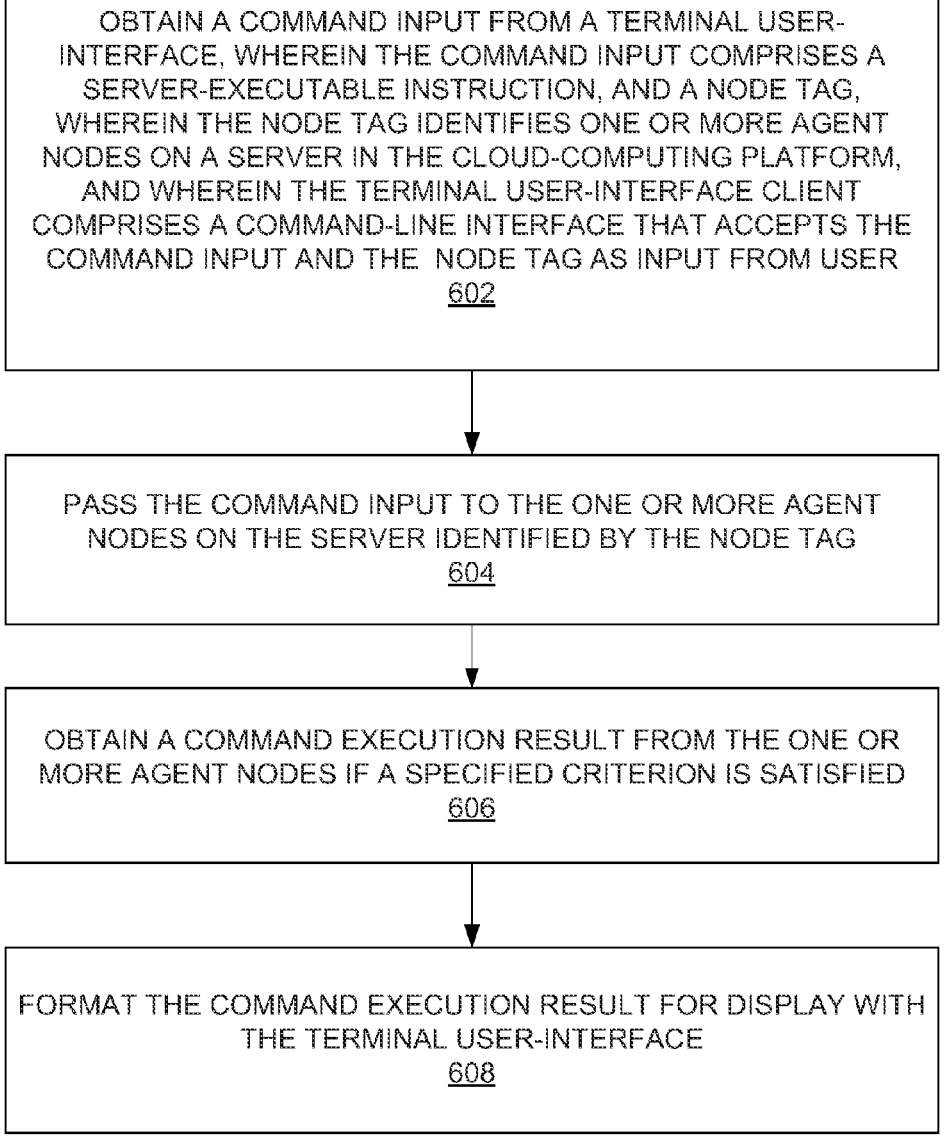
FIG. 6 illustrates an example process, according to some embodiments.

FIG. 6 illustrates an example process 600 according to some embodiments. In step 602, a command input is obtained from a terminal UI. The command input can include a server-executable instruction and a node tag. The node tag can identify one or more agent nodes that resides on a server in the cloud-computing platform. An agent node can be associated with a particular user account and implement user command input on the server. An agent node can reside in a plurality (e.g. and even all) the servers in the server cloud-computing platform. The terminal UI client can include a command-line interface, as well as other user input functionalities (e.g. drop down menus, radio buttons and the like), that accept command input and the node tag as input from a user. Command input can be in a script format such as can be utilized with an operating system running in the server. Optionally, the command input can be modified by a server management platform (e.g. 106 in FIG. 1) in order for the script to be understood by the various operating systems found in servers in the cloud cluster. In step 604, the command input can be passed to one or more agent nodes on the server identified by the node tag. The command input can be executed. In step 606, a command execution result is obtained from one or more agent nodes if a specified criterion is satisfied (e.g. successful execution of the command). It should be noted that the command input can be passed to and executed on a plurality of servers. Thus, a plurality of agent nodes (one for each server) can return a command execution result. In step 608, the command execution result can be formatted for display (e.g. a log file can be generated with the command execution result data) with the terminal UI. The various systems of FIG. 1-4 can be utilized to implement process 600.

Figure 7:
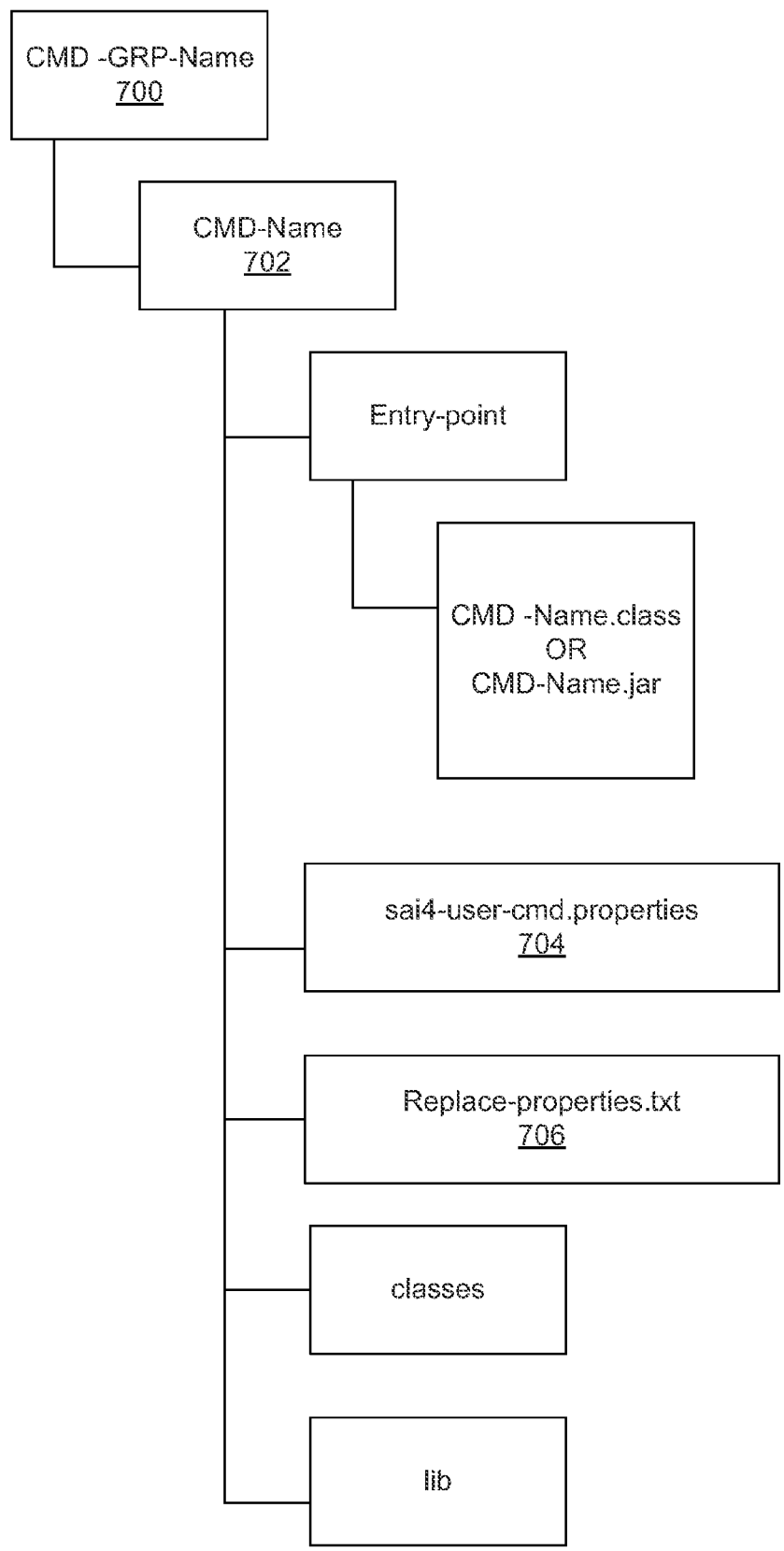
FIG. 7 illustrates an example of a sample custom command package format in the Java® programming language command file format.

FIG. 7 illustrates an example of a sample custom command package format in the Java® programming language command file format. The command file 700 can be a zip file with the same name as the command. After the zip file 700 is extracted, the format of the folder can appear as the format provided in FIG. 7. Before deploying the command, the sai4 agent can replace file path token SAI4_CMD_ROOT_PATH and SAI4_CMD_BASE_PATH with the actual path as well as the global, node tag and host properties with the sai4-user-cmd.properties file 702. The sai4-user-cmd.properties file 702, if present, can have the global, node tag and host specific properties. The SAI4_CMD_ROOT_PATH, SAI4_CMD_BASE_PATH properties can be replaced with actual specified values. The replace-properties.txt file 704, if present, should include the relative path of the files that need to have the global, node tag and host properties replaced.

Figure 8:
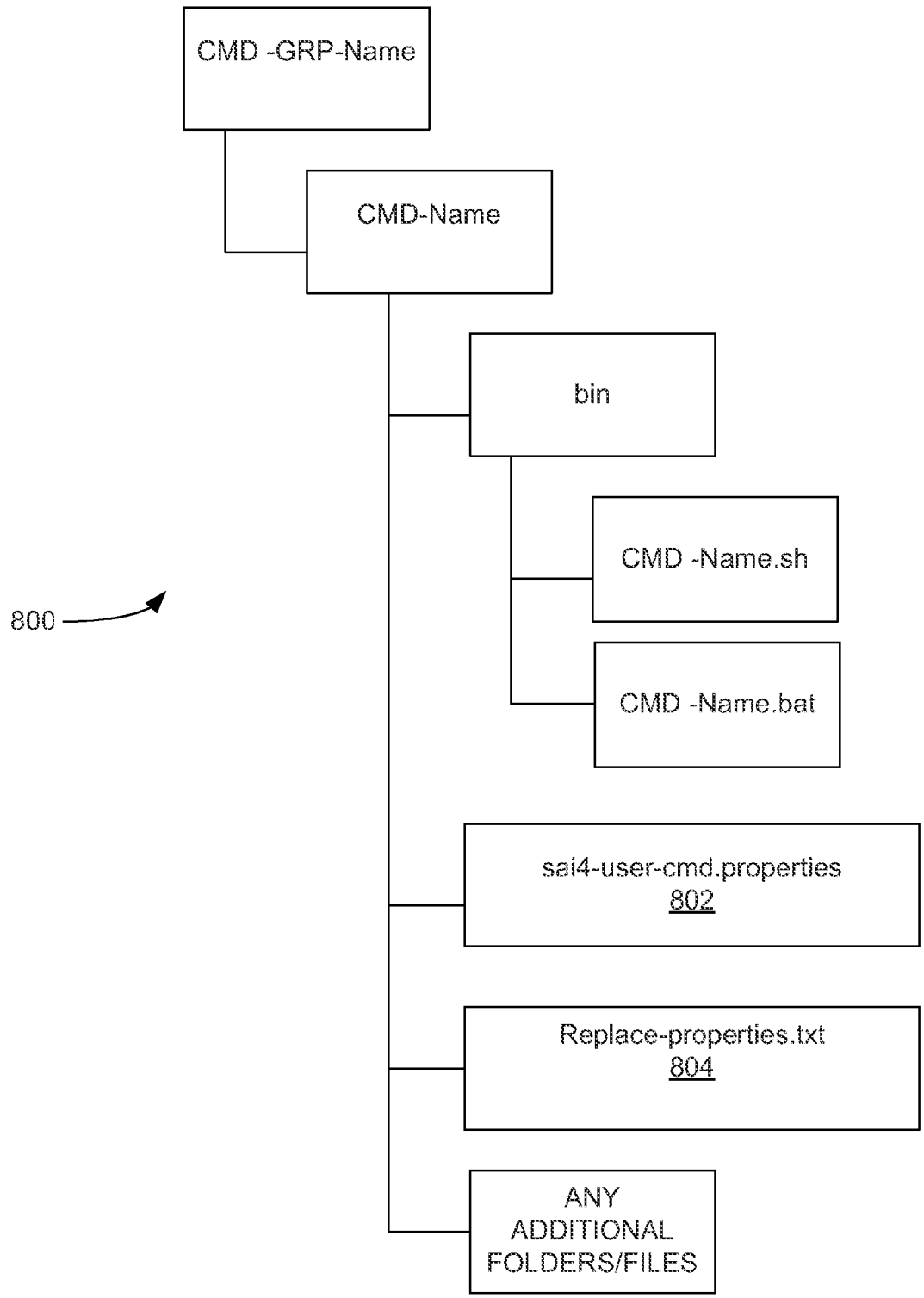
FIG. 8 illustrates an example of a sample custom command package format in the Shell command file format.

FIG. 8 illustrates an example of a sample custom command package format in the Shell command file format. The command file 800 can be a zip file with the same name as the command. After the zip file 800 is extracted, the format of the folder can appear as the format provided in FIG. 8. Before deploying the command, the SAI4 agent can replace a file path token such as SAI4_CMD_ROOT_PATH with the actual path as well as the global, node tag and host properties within the CMD-Name.bat files. The said-user-cmd.properties file 802, if present, can have the global, node tag and host specific properties as well as replacing the SAI4_CMD_ROOT_PATH and SAI4_CMD_BASE_PATH with actual specified values. The replace-properties.txt file 804, if present can include the relative path of the files that have the global, node tag and host properties replaced. It is noted that the processes of FIG. 7 and FIG. 8 can be modified to customize other command packages implemented with other programming languages.

Other optional functionalities can be implemented with user custom commands. For example, a user can upgrade a custom command; system 100 can then automatically implement the upgraded custom command across all relevant servers. Optionally, in some embodiments, a user can create a custom command and then market the custom command (e.g. in an online marketplace website designed for the sale and purchase of customized commands).

User Perspectives and Use Case Examples According to Some Embodiments

In some embodiments, a user can use a terminal interface to execute commands across multiple servers. Users can specify the criteria for a result of execution of a command on each server/agent. All the result details of the command execution from each server may not be passed back to terminal client. Instead, the aggregated result can be returned. Thus, a smaller 'footprint in size' is provided as well as a view into the overall execution result for multiple servers. For example, if the command was executed on one hundred servers, the user, may find it difficult to review the output result from each of the one hundred agents (e.g. to determine on which agent the command succeeded and which one it failed). In this way, displaying an aggregate result count can facilitate meaningful user review of the agents' command execution statistics. A user may additionally be enabled to review individual agents where the command execution failed and retrieve additional details for further diagnosis.

In some embodiments, a user can further batch the agents in groups, such that a command is executed on each batch at a time (e.g. the user does not does not want all agents to be down at the same time for an installation). From user's perspective, the command is typed the command once. The agents, as per user input, can then execute the command one batch at a time, without additional input by the user. For example, if a user wishes to deploy a new version of a product on all of the agents, but does not want all the agents at a same time for the installation of the new version installation.

Figure 9:
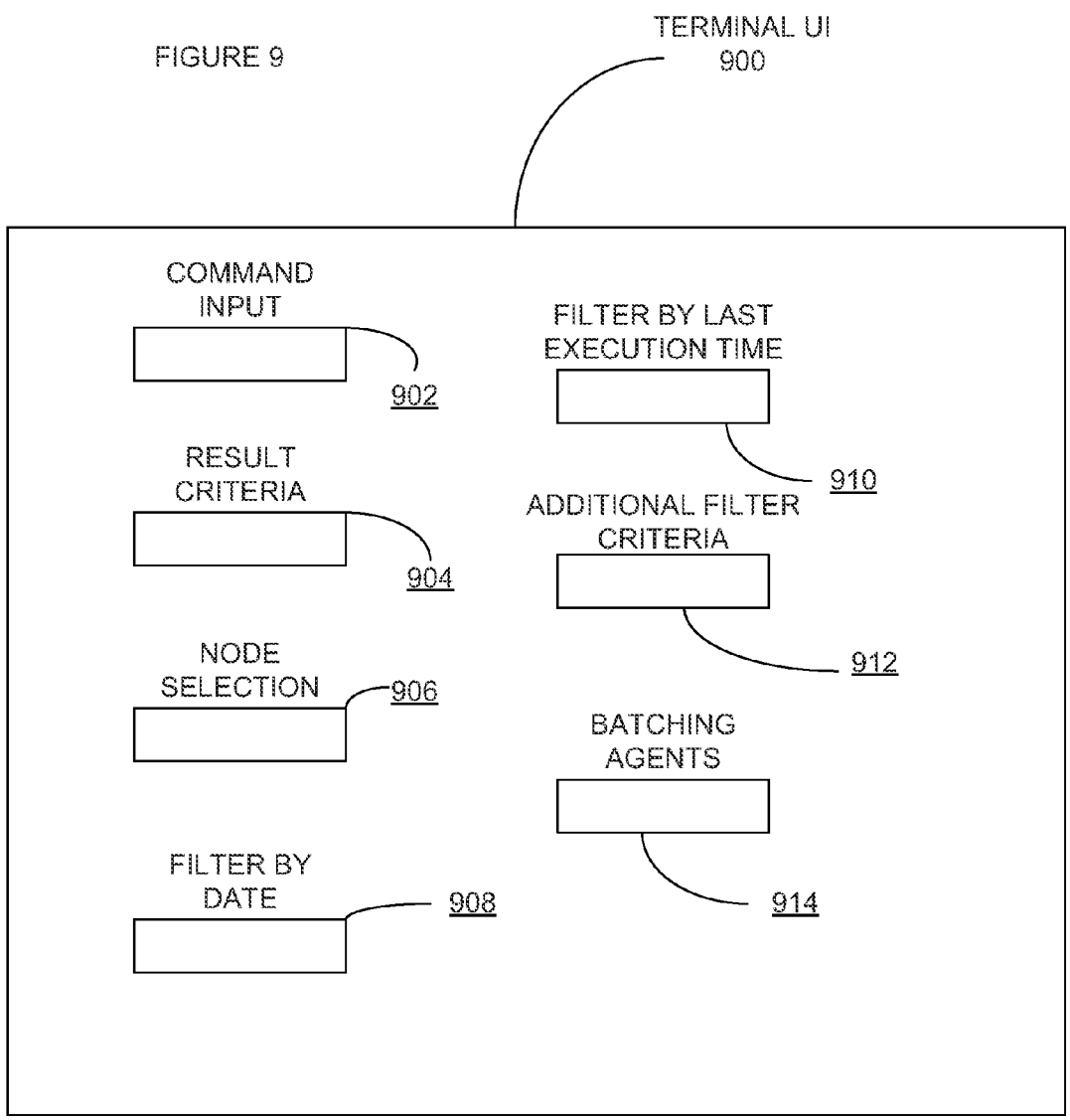
FIG. 9 illustrates an example of a user interface according one embodiment.

FIG. 9 illustrates an example of a user interface 900 according one embodiment. It is noted that FIG. 9 is provided by way of explanation and not of limitation and other user interface such as command-line interfaces can be used in other example embodiments. Thus, the various fields of FIG. 9 can be combined in a single terminal interface to execute commands according to specified criteria that are shown here to be input in separate fields. For example, the terminal interface can include a single command line for the input of "grep "Exception" /opt/app1/logs/app1.log" as a command or the various components of die command can be input into separate fields as shown in FIG. 9.

Command input can be input into field 902. Command input can include a string object representing a command name followed by various command arguments. Command input can include a single command, multiple command and/ or script input (e.g. a script in one or more supported computer programming language formats that can be executed by the system of FIGS. 1-3). In the result criteria field 904, a user can include input that defines at least one result criteria. Result criteria can include, inter alia, a report as to whether agents have successfully executed the command. Several types of result criteria can be defined. For example, a property name criteria can be input wherein a user defines a 'name' (e.g. with a string) that may appear in a stream output of the command being executed on each agent. In another example, a property name aggregate criteria can be input wherein a user defines each property name will have an integer value, that can be aggregated across the agents. A total value can then be displayed to the user. In the node selection field 906, a user can include a group of agents based on node tag identifiers (and/or individually selected specific agent(s) identifiers) on which the command is to be executed. In the filter by date field 908, a user can input further criteria to filter the selected agent list such as by agent creation date and the like. In the filter by last execution time field 910, a user can input further criteria to filter the selected agent list by last execution time of the same command. In the additional filter criteria field 912, a user can input further criteria to filter the selected agent list by such parameters as the operating system and/or other user-defined categories. In the batching agents field 914, a user can further categorize the selected agent list into batch units. The command can then be sequentially executed on each batch. Terminal output fields (not shown) can be formatted and populated with output data related to the above-described input fields once the command is executed. Example output fields may include: results, status, total agents succeeded, total agents failed, criteria output, criteria name, repeat count, output count, aggregated output count, and the like.

In one example of the use of a user interface (e.g. user interface 900), a single command input can be a command string such as "grep "Exception"/opt/app1/logs/app1.log", and the like. The result criteria cat be defined by the user as "SQLException, OutOfMemoryError". The node tag input can be "APP1_TAG". In this example, ten agents may be available under the APP1_TAG. When the above system command is executed, the command put can be passed on to all the agents that have APP1_TAG. The agent can then execute the command. In this particular case, the grep is a system command, which on execution writes the matching string to output stream. Each agent can use the output criteria names in the output stream, and increment the count by one every time a matching output criteria name is encountered. For example, four of the agents may output the following output criteria counts: "SQLException—5 OutOfMemoryError—1". The remaining agents may output the following output criteria counts: "SQLException-1 OutOfMemoryError—0". Finally, once command is executed on all the ten agents following output will be displayed with the terminal: "Total Success 10 Total Failed 0 SQLException—26 OutOfMemoryError—4". Therefore, the user can determine that the command ran successfully on all the agents identified under APP1_TAG.

In another example, multiple command input can include a list of cot inputs such as "ucopysource_file_full_pathtarget_file_full_path", "replacetarget_file_full_path-HOST.IP.ADDRESS$divine.host.ip", "./target_file_full_path" to be executed in sequence. The output criteria are defined as "Success Fair". The node tag input can be "APP1_TAG". The agent can then execute the commands in sequence (e.g. on all agents in parallel or on batches of agents in parallel). In this case, the command is a custom command, so it might not be present on the agent nodes. It is determined if the latest version of custom command already exists on the agent node or not. If it does not exist, the latest custom command can be downloaded and installed on the agent node prior to execution. In this particular case, the first command involves the file from client to be copied to all the agents. The second command involves replacing the token HOST.IP.ADDRESS in the file with the agent node's IP address. The third command involves executing the file. The agents can identify the output criteria names in the output stream, and increment the count by one every time it encounters a matching output criteria name. For example, eight of the agents may output the following output criteria counts: "Success—1 Error—0". In addition, one of the agents may determine the following output criteria count: "Success—0 Error—1". This indicates that one agent failed to execute the command (e.g. may have 'crashed'). Finally, on the user's terminal the following results can be displayed: "Total Success 9 Total Failed 1 SQLException—8 OutOfMemoryError—1". Thus, the user can determine that the commands ran successfully on nine out of ten of the agents.

CONCLUSION

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although the present embodiments have been described with reference to specific example embodiments, various modifications and changes can be made to these embodiments without departing from the broader spirit and scope of the various embodiments. For example, the various devices,

What is claimed as new and desired to be protected by Letters Patent of the United States is:

1. A computer-implemented method for managing a cloud-computing server with a terminal user-interface client:
    obtaining a command input from a terminal user-interface,
        wherein the command input comprises a server-executable instruction, and a node tag, and
        wherein the node tag identifies at least one agent node on a server in the cloud-computing platform, and
        wherein the terminal user-interface client comprises a command-line interface that accepts the command input and the node tag as input from user;
    passing the command input to the at least one agent node on the server identified by the node tag;
    obtaining a command execution result from the at least one agent node if a specified criterion is satisfied;
    formatting the command execution result for display with the terminal user-interface, wherein the command execution result comprises a aggregated
        result of the at least one agent node command execution statistics;
    counting a number of servers that failed to execute the command input; and
    pushing the number of servers that failed to execute the command input to the terminal user-interface.

2. The computer-implemented method of claim 1, wherein obtaining a command execution result from the at least one agent node if a specified criterion is satisfied comprises:
    obtaining a command execution result from the at least one agent node if the server failed to execute the command input.

3. The computer-implemented method of claim 1, wherein the command input comprises an operating system command.

4. The computer-implemented method of claim 3, wherein the command input comprises a shell script for a command line interpreter emulator, and wherein the shell script is executable by a first operating system of a first server identified by the node tag.

5. The computer-implemented method of claim 4, wherein the shell script is translated into a first format executable by the first operating system of the first server identified by the node tag and into a second format executable by a second operating system of a second server identified by the node tag.

6. The computer-implemented method of claim 1, wherein the command input comprises a custom command.

7. The computer-implemented method of claim 1, wherein the command input comprises an inline script.

8. The computer-implemented method of claim 1, wherein the terminal user-interface comprises a distribute terminal emulator with at least one command-line input that is formatted for display with a smartphone.

9. The computer-implemented method of claim 1 further comprising:
    obtaining a command sequence definition from the terminal user-interface,
        wherein the command sequence definition comprises a specified order for a plurality of command inputs to be executed.

10. The computer-implemented method of claim 9 further comprising:
    associating the command sequence definition with the node tag such that when a new node is created in a server, the command sequence is automatically executed.

11. The computer-implemented method of claim 10 further comprising:
    specifying dynamic properties that are replaced at runtime by the at least one agent node before command execution by the server.

12. A system of managing a server in a cloud-computing environment comprising:
    a terminal user-interface (UI) client configured to:
        accept a user-scripted command from a user, wherein the user-scripted command comprises an operating system command or a user-customized command,
        pass the user-scripted command to a distributed server management platform,
        accept a node tag input by a user, wherein the node tag identifies at least one agent node in a server in the cloud-computing platform to execute the user-scripted command;
    a distributed server management platform to pass the user-scripted command to a group broker of an agent group comprising the agent node identified by the node tag, and pass a command result to the terminal UI, and wherein the command result comprises a count successfully executed commands; and
    a group broker to pass the user-scripted command to the agent node, and to pass a command result from the agent node to the distributed server management platform.

13. The system of claim 12, wherein each user is assigned an agent node in each server of the cloud-computing platform.

* * * * *